US008014907B2

(12) United States Patent
Coulmeau

(10) Patent No.: US 8,014,907 B2
(45) **Date of Patent: *Sep. 6, 2011**

(54) METHOD OF ASSISTING IN THE NAVIGATION OF AN AIRCRAFT WITH AN UPDATING OF THE FLIGHT PLAN

(75) Inventor: François Coulmeau, Seilh (FR)

(73) Assignee: Thales (FR)

(*) Notice: Subject to any disclaimer, the term of this patent is extended or adjusted under 35 U.S.C. 154(b) by 1210 days.

This patent is subject to a terminal disclaimer.

(21) Appl. No.: 11/686,339

(22) Filed: Mar. 14, 2007

(65) Prior Publication Data

US 2007/0219679 A1 Sep. 20, 2007

(30) Foreign Application Priority Data

Mar. 14, 2006 (FR) .................................... 06 02214

(51) Int. Cl.
*G01C 23/00* (2006.01)

(52) U.S. Cl. ............ 701/3; 455/98; 455/66.1; 244/186; 701/4

(58) Field of Classification Search .............. 701/3, 8–9, 701/14, 4, 11, 200, 35, 116, 16; 73/178 R; 340/945, 961, 947–948; 244/1 R, 76 R, 175, 244/181, 1, 189; 342/38
See application file for complete search history.

(56) References Cited

U.S. PATENT DOCUMENTS 5,200,901 A * 4/1993 Gerstenfeld et al. .......... 701/120
5,337,982 A * 8/1994 Sherry .......................... 244/186
5,978,715 A * 11/1999 Briffe et al. ..................... 701/11
6,038,498 A * 3/2000 Briffe et al. ....................... 701/3
6,112,141 A * 8/2000 Briffe et al. ..................... 701/14
6,173,159 B1 * 1/2001 Wright et al. ................ 455/66.1
6,633,810 B1 10/2003 Qureshi et al.
6,711,475 B2 * 3/2004 Murphy ............................ 701/3
6,828,922 B1 * 12/2004 Gremmert et al. ............ 340/949
6,870,490 B2 * 3/2005 Sherry et al. .................. 340/970

(Continued)

FOREIGN PATENT DOCUMENTS

EP 842396 A1 * 5/1998

(Continued)

OTHER PUBLICATIONS

Flight simulations using time control with different levels of flight guidance; De Smedt, D.; Putz, T.; Digital Avionics Systems Conference, 2009. DASC '09. IEEE/AIAA 28$^{th}$; Digital Object Identifier: 10.1109/DASC.2009.5347544; Publication Year: 2009, pp. 2.C.5-1-2.C.5-15.*

(Continued)

*Primary Examiner* — Cuong H Nguyen
(74) *Attorney, Agent, or Firm* — Lowe Hauptman Ham & Berner, LLP

(57) ABSTRACT

The invention relates to a method of assisting in the navigation of an aircraft comprising a step for updating a flight plan according to a new clearance originating from an air traffic control authority and received on board by a ground/onboard communication system. The clearance comprises an action conditional on the flight plan linked to a floating point of the path defined by a time constraint of the aircraft; on receipt of the new clearance, the update is performed directly by means of the FMS linked to the communication system. This is a predictive method.

15 Claims, 6 Drawing Sheets

U.S. PATENT DOCUMENTS

Figure 1:
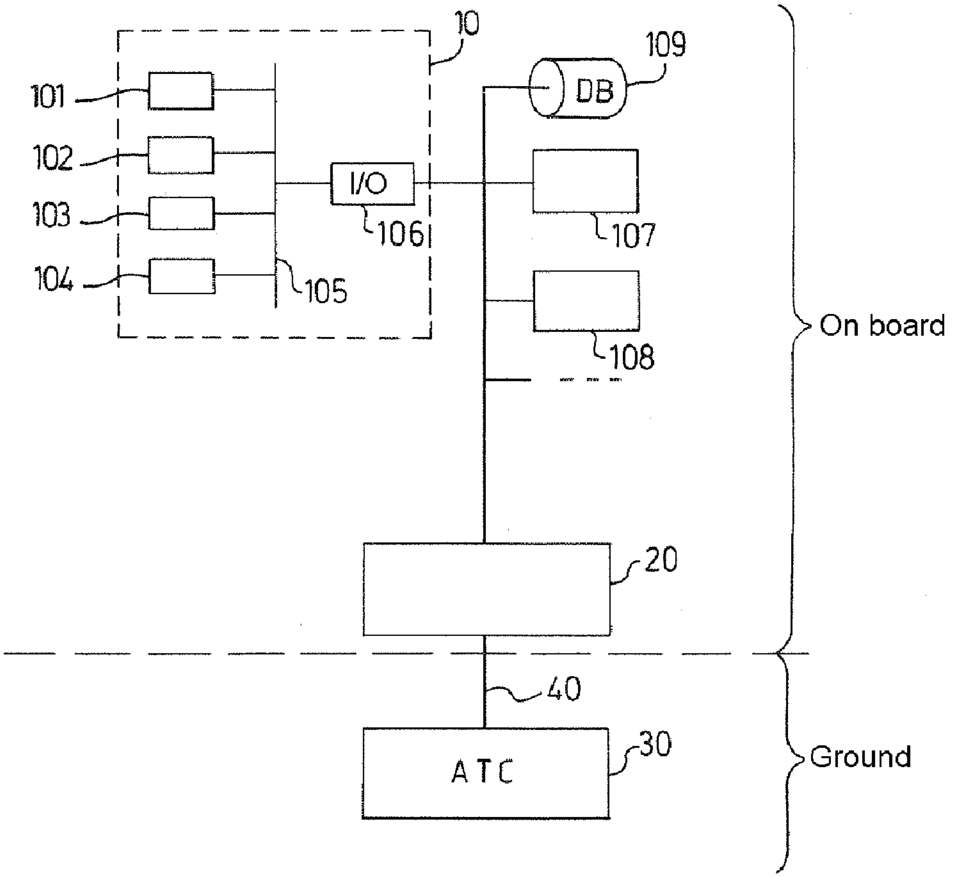

| | | | | | |
|---|---|---|---|---|---|
| RE40,479 | E | * | 9/2008 | Wright et al. | 455/98 |
| 7,788,034 | B2 | * | 8/2010 | Bui | 701/302 |
| 2002/0147542 | A1 | * | 10/2002 | Tomescu | 701/120 |
| 2003/0036827 | A1 | * | 2/2003 | Murphy | 701/3 |
| 2003/0058134 | A1 | * | 3/2003 | Sherry et al. | 340/945 |
| 2003/0093187 | A1 | * | 5/2003 | Walker | 701/1 |
| 2003/0193409 | A1 | * | 10/2003 | Crank | 340/970 |
| 2004/0107027 | A1 | * | 6/2004 | Boudrieau | 701/1 |
| 2005/0049762 | A1 | * | 3/2005 | Dwyer | 701/3 |
| 2005/0091036 | A1 | * | 4/2005 | Shackleton et al. | 704/9 |
| 2005/0203676 | A1 | * | 9/2005 | Sandell et al. | 701/3 |
| 2006/0041345 | A1 | * | 2/2006 | Metcalf | 701/33 |
| 2007/0129855 | A1 | | 6/2007 | Coulmeau | |
| 2007/0179703 | A1 | | 8/2007 | Soussiel et al. | |
| 2007/0219678 | A1 | | 9/2007 | Coulmeau | |
| 2010/0156673 | A1 | * | 6/2010 | Grothe | 340/961 |
| 2010/0292871 | A1 | * | 11/2010 | Schultz et al. | 701/3 |

FOREIGN PATENT DOCUMENTS

| | | | | |
|---|---|---|---|---|
| WO | WO 9705450 | A1 | * | 2/1997 |
| WO | WO 2005045785 | A1 | * | 5/2005 |
| WO | WO 2007005007 | A2 | * | 1/2007 |
| WO | WO 2007086899 | A3 | * | 11/2007 |
| WO | WO 2010043734 | A1 | * | 4/2010 |

OTHER PUBLICATIONS

Vital—an advanced time-based tool for the future 4D ATM environment; Hering, H.; Digital Avionics Systems Conference, 2004. DASC 04. The 23rd; vol. 1; Publication Year: 2004 , pp. 3.B.5-3.1-8 vol. 1.*

4D FMS for Increasing Efficiency of TMA Operations; Korn, B.; Kuenz, A.; 25th Digital Avionics Systems Conference, 2006 IEEE/AIAA; Digital Object Identifier: 10.1109/DASC.2006.313663; Publication Year: 2006 , pp. 1-8.*

Flight management of multiple aerial vehicles using genetic algorithms; Kanury, S.; Song, Y.D.; System Theory, 2006. SSST '06. Proceeding of the Thirty-Eighth Southeastern Symposium on; Digital Object Identifier: 10.1109/SSST.2006.1619100 Publication Year: 2006 , pp. 33-37.*

Using 4DT FMS data for green approach, A-CDA, at Stockholm Arlanda airport; Friberg, N.; Digital Avionics Systems; Conference, 2007. DASC '07. IEEE/AIAA 26th ; Digital Object Identifier: 10.1109/DASC.2007.4391824; Publication Year: 2007 , pp. 1.B.3-1-1.B.3-9.*

On the design of a UAS flight plan monitoring and edition system; Pastor, E.; Santamaria, E.; Royo, P.; Lopez, J.; Barrado, C.; Aerospace Conference, 2010 IEEE; Digital Object Identifier: 10.1109/AERO.2010.5446778; Publication Year: 2010 , pp. 1-20.*

Assessment of controller situation awareness in future terminal RNAV operations; Smith, E.C.; Digital Avionics Systems Conference, 2007. DASC '07. IEEE/AIAA 26th; Digital Object Identifier: 10.1109/DASC.2007.4391954; Publication Year: 2007 , pp. 6.B.3-1-6.B.3-13.*

Three dimensional optimum controller for multiple UAV formation flight using behavior-based decentralized approach; Seungkeun Kim; Youdan Kim; Control, Automation and Systems, 2007. ICCAS '07. International Conference on; Digital Object Identifier: 10.1109/ICCAS.2007.4406555; Publication Year: 2007 , pp. 1387-1392.*

Piloted simulation of NextGen time-based taxi clearances and tailored departures; Foyle, D.C.; Hooey, B.L.; Kunkle, C.L.; Schwirzke, M.F.J.; Bakowski, D.L.; Integrated Communications, Navigation and Surveillance Conference, 2009. ICNS '09. Digital Object Identifier: 10.1109/ICNSURV.2009.5172838; Publication Year: 2009 , pp. 1-11.*

Role of avionics in trajectory based operations; Jackson, M.; Digital Avionics Systems Conference, 2008. DASC 2008. IEEE/AIAA 27th; Digital Object Identifier: 10.1109/DASC.2008.4702792; Publication Year: 2008 , pp. 3.A.1-1-3.A.1-9.*

Role of avionics in trajectory-based operations; Jackson, M.R.C.; Aerospace and Electronic Systems Magazine, IEEE vol. 25 , Issue: 7 , Part: Part 1; Digital Object Identifier: 10.1109/MAES.2010.5546289; Publication Year: 2010 , pp. 12-19.*

3D Path Concept and Flight Management System (FMS) Trades; Schoemig, E.G.; Armbruster, J.; Boyle, D.; Haraldsdottir, A.; Scharl, J.; 25th Digital Avionics Systems Conference, 2006 IEEE/AIAA; Digital Object Identifier: 10.1109/DASC.2006.313689 Publication Year: 2006 , pp. 1-12.*

An empirical evaluation of the Integrated Tower Operations Digital Data System; Truitt, T.R.; Integrated Communications, Navigation and Surveillance Conference, 2009. ICNS '09.; Digital Object Identifier: 10.1109/ICNSURV.2009.5172841 Publication Year: 2009 , pp. 1-8.*

The 4D trajectory data link (4DTRAD) service—Closing the loop for air traffic control; Jackson, M.R.C.; Gonda, J.; Mead, R.; Saccone, G.; Integrated Communications, Navigation and Surveillance Conference, 2009. ICNS '09.; Digital Object Identifier: 10.1109/ICNSURV.2009.5172860; Publication Year: 2009 , pp. 1-10.*

Assessment of controller situation awareness in future terminal RNAV operations; Smith, E.C.; Digital Avionics Systems Conference, 2007. DASC '07. IEEE/AIAA 26th; Digital Object Identifier: 10.1109/DASC.2007.4391954; Publication Year: 2007 , pp. 6.B.3-1-6.B.3-13.*

Raja Parasuraman et al., "A Model for Types and Levels of Human Interaction with Automation", IEEE Transactions on Systems, Man and Cybernetics. Part A; Systems and Humans, IEEE Service Center, Piscataway, NJ, US, vol. 30, No. 3, May 2000, XP011056321; ISSN: 1083-4427; pp. 287,289,293.

* cited by examiner

Initial vertical profile in solid line, with offset in broken line

METHOD OF ASSISTING IN THE NAVIGATION OF AN AIRCRAFT WITH AN UPDATING OF THE FLIGHT PLAN

RELATED APPLICATIONS

The present application is based on, and claims priority from, France Application Number 06 02214, filed Mar. 14, 2006, the disclosure of which is hereby incorporated by reference herein in its entirety.

The invention relates to assistance in the navigation of an aircraft and, more specifically, management of the onboard flight plan.

It will be remembered that an aircraft is equipped with a navigation aid system called FMS (Flight Management System). This exchanges a variety of information with the ground and with other equipment on the aircraft. It communicates with the crew of the aircraft via man-machine interfaces.

The flight management system helps the crew in programming the flight plan before take-off and in following the path of the flight plan from take-off through to landing. Its assistance in programming the flight plan consists on the one hand in plotting, in the horizontal and vertical planes, a sketch of the path formed by a succession of waypoints (WP) associated with various clearances, such as altitude, speed, heading or other factors and on the other hand in calculating, also in the horizontal and vertical planes, the path that the aircraft must follow to complete its mission.

When preparing the programming of the flight plan, the crew inputs into the flight management system, explicitly or implicitly, the geographic coordinates of the waypoints and the clearances that are associated with them, and obtains from the flight management system a sketch of the path, a flight path and a flight plan. The path is made up of a chain of segments linking pairs of waypoints from the starting point through to the destination point, and arcs of circle, both to ensure the heading transitions between segments at the waypoints and to follow certain curved segments. The path sketch and the path are displayed on a navigation screen to enable the crew to check their relevance. The flight plan comprises the horizontal and vertical paths together with the clearances. The vertical path is normally designated vertical profile.

Before take-off, the onboard flight plan of the aircraft and that of the air traffic control (ATC) authority are identical.

During the flight, unforeseen events occur that will modify the flight plan. These are, for example, changes in the weather, traffic, even onboard failures, etc. These events are communicated to the ATC when it has no knowledge of them. The ATC can then transmit to a ground/onboard communication system (CMU, standing for Communication Management Unit) linked to the FMS, new clearances taking into account these events, via, for example, a digital link C/P-DLC (Controller/Pilot-Data Link Communication). The crew takes note of these new clearances through a man-machine interface of the FMS or of the CMU.

Clearances with or without impact on the flight plan are differentiated. Among the clearances that have an impact on the flight plan, some can be implemented automatically in the FMS via existing functions, but are, in fact, performed by the FMS only manually, at the request of the pilot. These clearances are, for example:

- modify a part of the flight plan,
- notify ATC of the state of the aircraft,
- conditional action by which the ATC asks for an action to be performed when a condition is met.

The conditional clearances are of three types

- AT [position] PERFORM [action to be performed], the [position] parameter representing a geographic position,
- AT [time] PERFORM [action to be performed], the [time] parameter representing a time,
- AT [altitude] PERFORM [action to be performed], the [altitude] parameter representing an altitude defined according to various formats.

The action to be performed is of the “CLIMB”, “DEVIATE”, “REDUCE SPEED TO”, and other such types.

In the case of a conditional action, only the “condition” part, that is the AT [parameter] part, is currently (i.e. since 2000, as part of the so-called FANS 1/A implementation) transmitted to the FMS to be monitored, but the “action” part is not transmitted to the FMS.

When this action is transposable by a function of the FMS, it is activated by the pilot who manually modifies the FMS flight plan to perform the “action” part of the clearance, when the crew is informed by the FMS that the condition is met. The FMS then performs an updating of the predictions on the flight plan and the path is modified accordingly.

However, most of the actions to be performed cannot be transposed by a function of the FMS. Among these, there are those that are linked to a floating point of the horizontal and/or vertical paths. The term “floating point of a path” is used to denote a point whose geographic coordinates are not fixed, that is, whose latitude and longitude coordinates are not fixed, unlike the points whose coordinates are fixed, such as those of a town.

The description below addresses the conditional actions linked to a floating point of the path, represented by a time datum also called time marker. These clearances are collated in a normative document of the International Civil Aviation Organization (ICAO), known by the name of “SARPS ATN” or Doc9705).

The current FMS systems do not make it possible to manage clearances consisting in making lateral or vertical modifications to a floating position defined by its time.

On an instruction from the pilot, the modified path can be activated as a reference FMS path and transmitted to the guidance system of the aircraft (FGS, standing for Flight Guidance System, comprising, among other things, the automatic pilot and the automatic throttle) and to ATC via the communication interface CMU. The FMS and ATC then have the same flight plan.

When this action cannot be transposed by a function of the FMS, it is performed manually by the pilot, either by acting directly on the flight controls, or by acting on the automatic pilot and the automatic throttle.

Whether a clearance can or cannot be transposed by the FMS, the intervention of the pilot to perform it has a number of drawbacks:

- the interpretation of the clearance can vary from one crew to another because, in particular, of the understanding of the language used, the quality of reception of the instruction, etc.,
- an application of the clearance, variable from one crew to another,
- an inconsistency between the onboard flight plan and that available to ATC,
- an exit from the FMS mode to switch to a so-called “selection” mode when carrying out the clearance which generates an inconsistency between what the radar operator on the ground observes compared to that which was predicted in the flight plan.

The aim of the invention is to enable the flight plan to be managed and executed on board by avoiding these drawbacks and, in particular, to enable ATC and the FMS to permanently have the same flight plan.

The invention relates to a method of assisting in the navigation of an aircraft comprising a step for updating a flight plan which comprises a lateral path and a vertical profile associated with clearances, the flight plan being updated according to a new clearance originating from an air traffic control authority and received on board by a ground/onboard communication system. It is mainly characterized in that the clearance comprises an action conditional on the flight plan linked to a floating point of the lateral path and/or of the vertical profile, defined by a time constraint of the aircraft, and in that, on receipt of the new clearance, the update is performed directly by means of a flight management system, called FMS, linked to the communication system.

Figure 2:
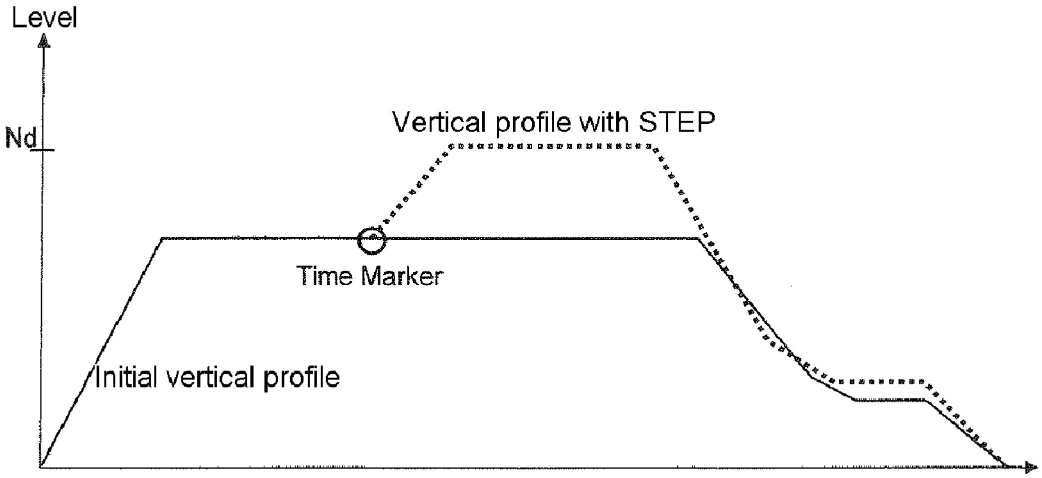
Figure 3:
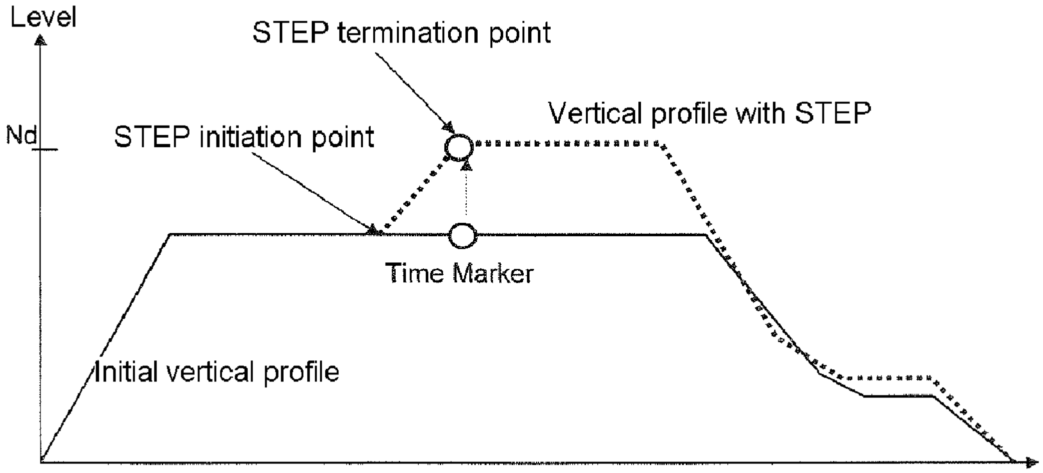
Figure 4A:
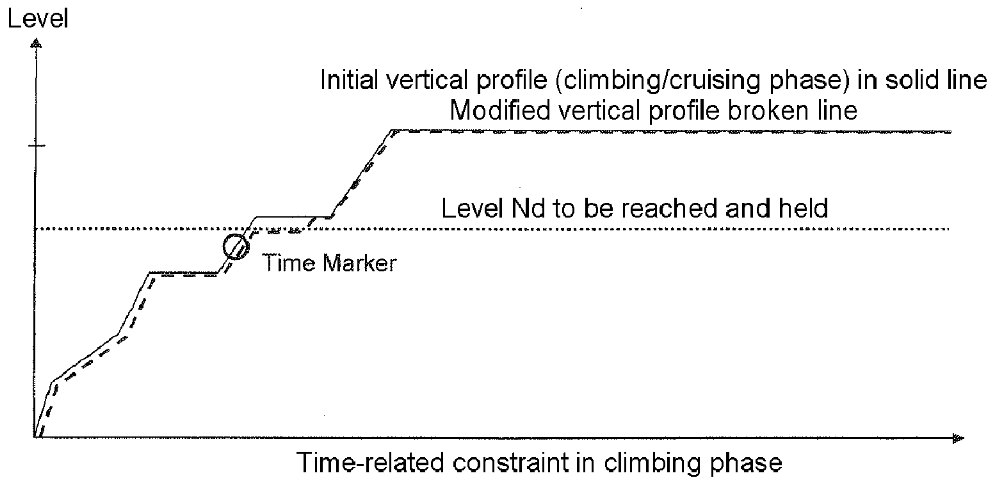
Figure 4B:
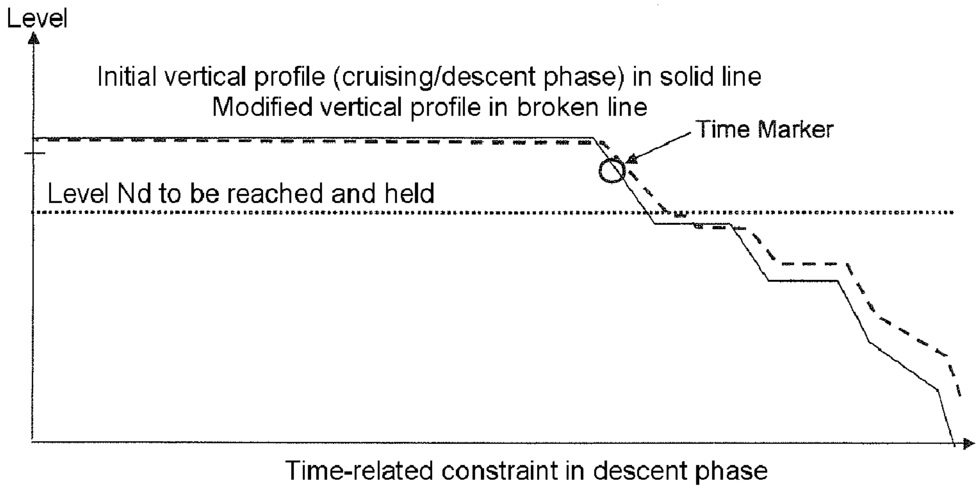
Figure 5A:
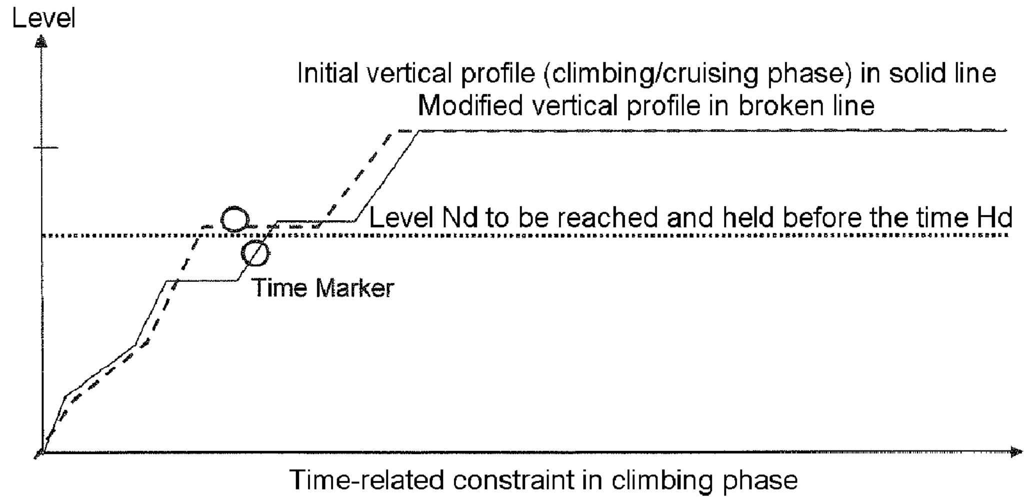
Figure 5B:
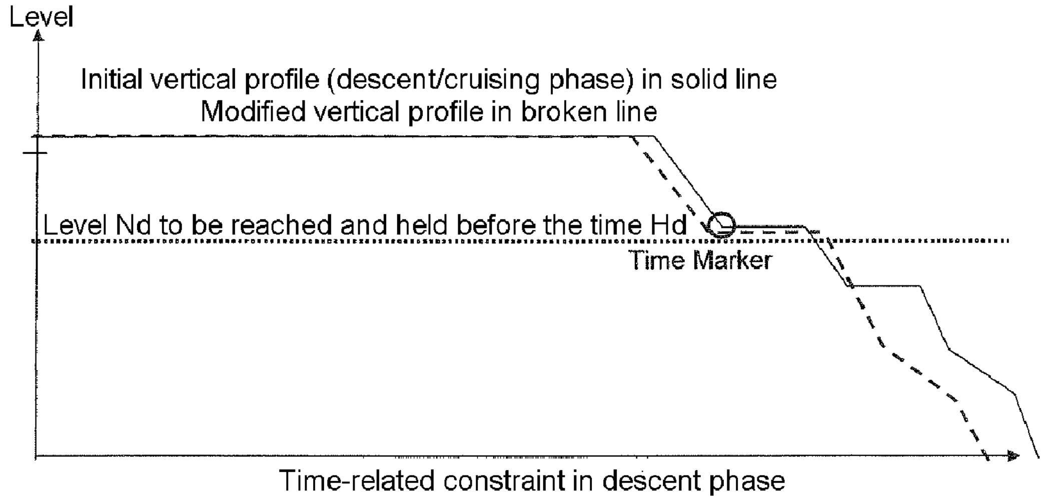
Figure 6:
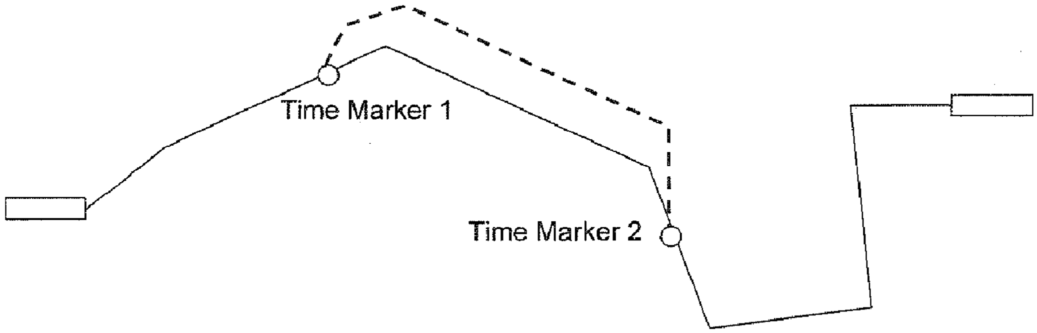

Other characteristics and advantages of the invention will become apparent from reading the detailed description that follows, given by way of non-limiting example, and with reference to the appended drawings, in which:

FIG. 1 diagrammatically represents an exemplary FMS computer,

FIG. 2 diagrammatically illustrates the clearance taking the form of "STEP ALT OF Nd AT Hd", FIG. 3 diagrammatically illustrates the clearance taking the form of "STEP ALT OF Nd BY Hd", FIGS. 4*a* and 4*b* diagrammatically illustrate the clearance taking the form of "ALT CSTR Nd AT Hd", respectively in the climbing and descent phases, FIGS. 5*a* and 5*b* diagrammatically illustrate the clearance taking the form of "ALT CSTR Nd BY Hd", respectively in the climbing and descent phases, FIG. 6 diagrammatically illustrates the clearance taking the form of "OFFSET (Dd, Ad) AT Hd1 TO Hd2".

Figure 7:
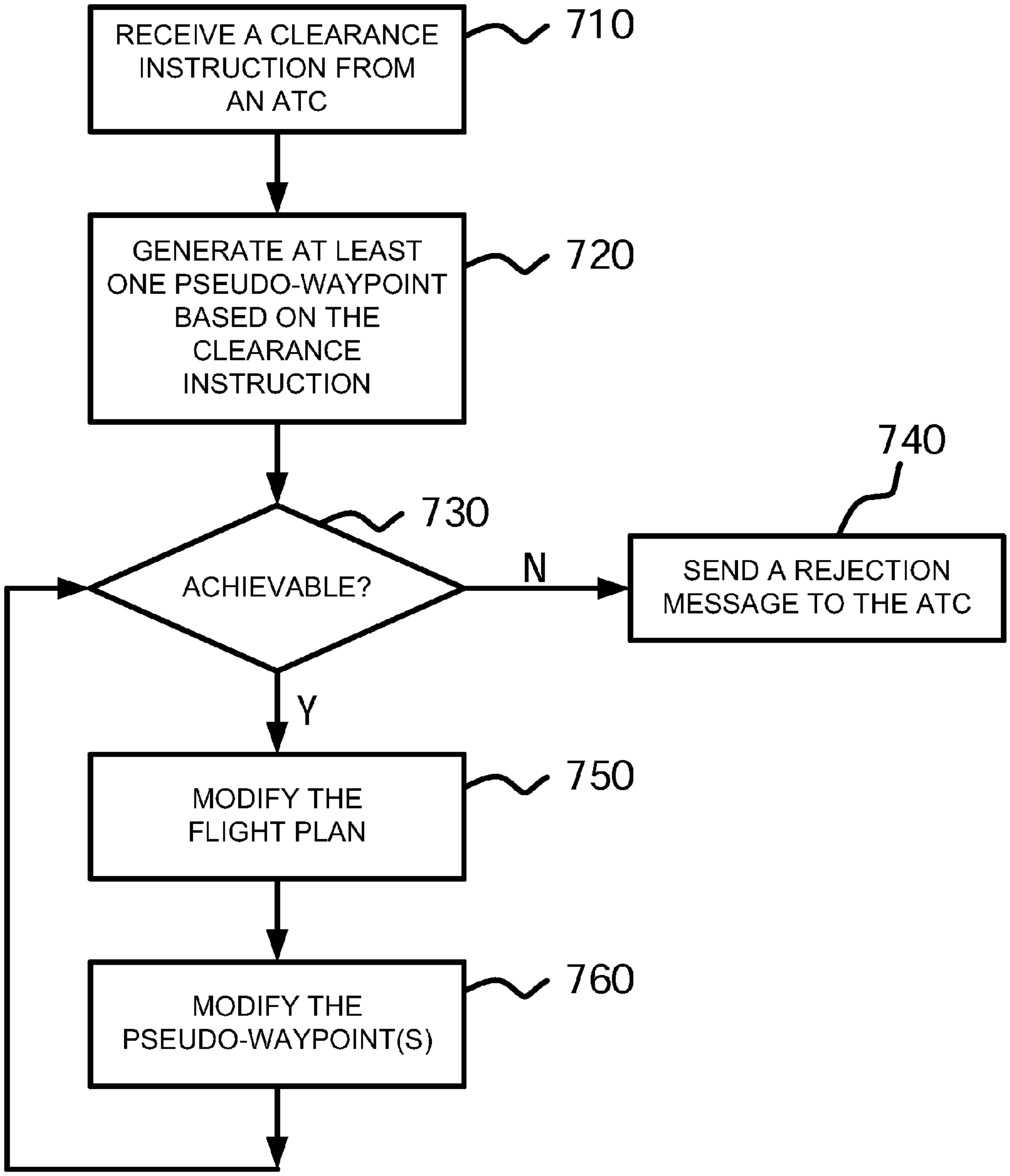

FIG. 7 is a flow chart of a method for assisting in the navigation of an aircraft according to some embodiments.

An FMS computer 10, represented in FIG. 1, conventionally comprises a central processing unit 101 which communicates with an input-output interface 106, a program memory 102, a working memory 103, a data storage memory 104, and circuits 105 for transferring data between these various elements. The input-output interface 106 is linked to various devices such as a man-machine interface 107, sensors 108, etc. This man-machine interface 107 can be used to enter a clearance manually or via the digital data link; the clearance is processed by the FMS. A performance table, specific to the aircraft, and the horizontal and vertical paths of the flight plan are stored in the data memory. The performance table contains the performance characteristics and limitations of the aircraft, such as the speed and gradient limitations of the aircraft, its maximum altitude, its stall speed, its consumption, its turn radius, its roll, and so on.

This FMS computer 10 is linked to a ground/onboard communication system 20 which is in turn linked to ATC 30 via a C/P-DLC digital link 40.

New FMS functions linked to clearances relating to a floating point in time originating from the ATC are created in the program memory 102.

Before describing these new functions, some definitions are reviewed below.

The altitude A/C Alt is the altitude of the aircraft.

The altitude ARR Alt is the altitude of the airport of arrival.

The level Min_level_cruise is a minimum level such that a descent to a level greater than this minimum level is interpreted as a "STEP DESCENT" when cruising and a descent to a level below this minimum level is interpreted as a descent phase constraint. Typically, Min_level_cruise is equal to FL250, that is 25000 ft above the isobar 1013.25 hPA.

A waypoint is a point whose latitude and longitude coordinates are fixed.

The following points are pseudo-waypoints characteristic of the levels of the cruising flight phase.

S/C (or Start of Climb) is the climb start point to change from one level to another.

T/C (or Top of Climb) is the climb end point to change from one level to another.

S/D (or Start of DES) or T/D (or Top of DES) is the descent start point to change from one level to another.

The so-called "GREEN DOT" longitudinal speed is the speed providing the best lift-over-drag ratio in clean configuration, that is, when the leading-edge slats and the flaps of the aircraft are retracted. It should be remembered that the speed vector of the aircraft comprises two components, the longitudinal speed (or just "speed") and the vertical speed, also called vertical rate, respectively considered in a horizontal plane and in the vertical direction, perpendicular to this plane. VS(GREEN DOT) is used to denote the vertical rate resulting from maintaining the "GREEN DOT" longitudinal speed at constant thrust; thus, more generally, VS (determined longitudinal speed) is used to denote the vertical rate resulting from a longitudinal speed and a determined thrust and VL (determined vertical rate) is used to denote the longitudinal speed resulting from a determined vertical rate and thrust.

VMO/MMO is used to denote the maximum longitudinal speed torque and mach.

Time Marker is used to denote a pseudo-waypoint which is a floating point, in HHMMSS format, displayed on the path at the place where the time HH:MM:SS will be reached.

A waypoint or "Fix" is a point whose latitude/longitude coordinates are fixed.

A "Leg" is an element of the flight plan describing how to reach a waypoint if the termination of the leg is a "Fix", or the event that is the termination of the leg (altitude, interception of next leg). These concepts are described in the normative aeronautical document Arinc 702A.

The Nd parameter comprises a numerical value and a reference value.

FIG. 7 is a flow chart of a method for assisting in the navigation of an aircraft according to some embodiments. In FIG. 7, a method of modifying a flight plan of an aircraft by a flight management system onboard the aircraft is illustrated. A person of ordinary skill in the art will appreciate that the method of FIG. 7 is merely illustrative. In some embodiments, operations of the method need not to be performed according to the order as depicted in FIG. 7. In some other embodiments, other operations may be performed before, during, or after the method of FIG. 7.

In operation 710, the FMS receives a clearance instruction from an air traffic control authority on the ground. The clearance instruction has an action to be performed upon occurrence of a condition. Then in operation 720, the FMS generates at least one pseudo-waypoint in the flight plan at which the condition of the clearance instruction is estimated to occur. Subsequently, in operation 730, it is determined by the FMS if modifying the flight plan according to the clearance instruction and the pseudo-waypoint is achievable. If it is determined to be not achievable, in operation 740, the FMS sends a rejection message to the air traffic control authority through the ground/onboard communication system 20. If it is determined that modifying the flight plan according to the clearance instruction and the pseudo-waypoint is achievable, the FMS modifies the flight plan in operation 750.

In operation 760, the FMS further modifies the at least one pseudo-waypoint. Then the process proceeds to operation 730, where the FMS determines if modifying the flight plan according to the clearance instruction and the modified pseudo-waypoint is achievable. In some embodiments, the process repeats cyclically among operations 730-760. More descriptions regarding the implementation of the method of FIG. 7 are provided below using specific example clearance instructions.

The following clearances are now considered. They are based on predictive algorithms which take account of the clearance in the flight plan, on receipt.

The clearance "reach a determined level Nd at a determined time Hd" or "STEP ALT OF Nd AT Hd", is used to perform a climb or a descent in the cruising phase, to a new level Nd assigned by ATC, at a given time Hd. It is then a "floating" STEP whose initiation point evolves as the predictions are calculated. To implement this clearance illustrated in FIG. 2, the updating of the flight plan which comprises segments consists in introducing into the flight plan of the FMS the following program which stabilizes the profile and makes it possible to avoid untimely prediction recalculations. It comprises an initialization step and a cyclical processing step.

Initialization:

Save the flight plan in a reference flight plan FPLN REF.

Create in the flight plan a pseudo-waypoint of "Time Marker" type whose HHMMSS parameter is equal to the Hd parameter.

If Time Marker belongs to the cruising segment, then

Create a STEP Initiation Point:

The cruising segments being rectilinear apart from the transitions (i.e., the turns linked to the passage from one segment to another, at a given waypoint, for example TOTO), the following algorithm is applied:

If the point defined by its geographic coordinates such as latitude and longitude is on the transition linked to the point TOTO, then take TOTO as the STEP initiation point.

Else (presently on the rectilinear parts)

create a point defined by its geographic coordinates such as latitude and longitude, whose coordinates are equal to those of the Time Marker pseudo-waypoint.

This makes it possible to hold the same lateral path as that of the flight path FPLN REF and therefore not to change the lateral path.

There is no need to place a time constraint equal to the parameter Hd on this STEP initiation point, because, at this stage, there is no change to the vertical profile because there is no time to be caught up or gained since a time constraint equal to the schedule prediction has been placed on the point.

Create a STEP ALT on the initiation point, with the Nd parameter as the level value.

If STEP ALT is correctly inserted in the flight plan, then

Accept the request.

Else reject the clearance with an "UNABLE" message to ATC; the STEP is rejected when the remaining cruising phase is too short, or non-existent, or the level is unreachable given the performance characteristics of the aircraft.

Endif

Else reject the clearance with an "UNABLE" message to ATC.

Endif

Cyclical Processing:

On each prediction cycle, perform the following operations:

Calculate the difference DeltaT1 between the predicted time at the STEP initiation point and the Hd parameter:

$$\text{Delta}T1 = Hd - \text{Predicted time at initiation point.}$$

Calculate the time needed DeltaT2 to reach the STEP initiation point, starting from the current time: DeltaT2=Predicted time at the initiation point−current time If ||DeltaT1||<predetermined threshold (for example 3 seconds), then change nothing in the profile Else, If threshold<||DeltaT1||<Predetermined tolerance, (for example equal to Max(threshold, Min(30 sec, (||DeltaT2−DeltaT1||)/||DeltaT2||) then Place a time constraint (RTA, standing for Required Time of Arrival) on the STEP initiation point, equal to the Hd parameter; the change of speed induced by this constraint only slightly modifies the flight plan and thus avoids prediction "jumps", particularly when approaching the STEP initiation point.

Else (||DeltaT1|| is great)

Delete the STEP initiation point.

Create a new STEP initiation point: create a Time Marker with the Hd parameter and calculate its geographic coordinates such as latitude and longitude.

If the point is on a transition linked to a point TOTO, then take TOTO as the STEP initiation point.

Else (on the rectilinear parts)

create a point defined by its geographic coordinates such as latitude and longitude, whose coordinates are equal to those of the Time Marker pseudo-waypoint Create a STEP ALT on the initiation point, with the Hd parameter as level value.

If the STEP ALT is correctly inserted into the flight plan, then

Accept the request.

Else reject the clearance with an "UNABLE" message to ATC.

Endif

Endif

The clearance "reach a determined level Nd at a determined time Hd" or "STEP ALT OF Nd BY Hd", makes it possible to perform a climb or a descent in the cruising phase, to a new level Nd assigned by ATC, to be reached at a given time Hd. It is therefore a "floating" STEP whose initiation point evolves according to the prediction calculation. To implement this clearance illustrated in FIG. 3, the updating of the flight plan which comprises segments consists in introducing into the flight plan of the FMS the following program which stabilizes the profile and makes it possible to avoid untimely prediction recalculations. It comprises an initialization step and a cyclical processing step.

Initialization:

Save the flight plan in a reference flight plan FPLN REF.

Create in the flight plan a pseudo-waypoint of "Time Marker" type whose HHMMSS parameter is equal to the Hd parameter.

If Time Marker belongs to the cruising segment, then knowing the climb or descent performance characteristics of the aircraft predicted on the cruising segment, determine the point at which it is necessary to begin climbing or descending to reach the level Nd, that is the STEP initiation point:

Store the cruising level at the Time Marker: CRZ FL TM

Determine the difference between this level and the new level to be reached: DeltaH=Nd−CRZ FL TM If DeltaH=0 then No change, accept the request Else, if DeltaH<0 then STEP to be created=STEP DESCENT Generate a descent with a vertical rate VS provided by the attitude and a longitudinal speed SPEED provided by the gas automatic throttle.

For example choose VS=−1000 ft/min

Knowing the rate of descent VS, calculate the time needed to perform the descent: T=DeltaH/VS Create a Time Marker pseudo-waypoint at the time Hd−T.

Create a point defined by its geographic coordinates (such as latitude and longitude) at the position of the Time Marker (or on the transition point if the Time Marker is in a turn) and introduce a STEP DES to the new level Nd at this point.

Else

STEP to be created=STEP CLIMB

Generate a climb with a longitudinal speed SPEED provided by the attitude and an engine thrust THR provided by the gas automatic throttle.

From the performance tables, obtain a vertical rate VS resulting from holding SPEED/THR.

Knowing the rate of climb VS, calculate the time needed to perform the descent: T=DeltaH/VS Create a Time Marker pseudo-waypoint at the time [Time]−T.

Create a point defined by its geographic coordinates (such as latitude and longitude) at the position of the Time Marker (or on the transition point if the Time Marker is in a turn) and introduce a STEP CLIMB to the new level Nd at this point.

Endif

Cyclical Processing:

On each prediction cycle, perform the following operations:

Calculate the difference DeltaT1 between the predicted time at the STEP termination point and the Hd parameter:

$$\text{Delta}T1 = Hd - \text{Predicted time at the termination point}$$

Calculate the time needed DeltaT2 to reach the STEP initiation point, starting from the current time: DeltaT2=Predicted time at the initiation point−current time If ||DeltaT1||<predetermined threshold (for example 3 seconds), then change nothing in the profile Else, If threshold<||DeltaT1||<Predetermined tolerance, (for example equal to Max(threshold, Min(30 sec, (||DeltaT2||), then Place a time constraint (RTA, Required Time of Arrival) on the STEP initiation point, equal to the parameter Nd−T The change of speed induced by this constraint only slightly modifies the flight plan and thus avoids prediction "jumps", particularly when approaching the STEP initiation point.

Else (||DeltaT1|| is great)

Delete the STEP. Recalculate the STEP:

If DeltaH=0 then

No change, accept the request

Else if DeltaH<0 then

STEP to be created=STEP DESCENT

Generate a descent with a vertical rate VS provided by the attitude and a longitudinal speed SPEED provided by the gas automatic throttle.

For example, choose VS=−1000 ft/min

Knowing the rate of descent VS, calculate the time needed to complete the descent: T=DeltaH/VS Create a Time Marker pseudo-waypoint at the time Hd−T.

Create a point defined by its geographic coordinates (such as latitude and longitude) in the position of the Time Marker (or on the transition point if the Time Marker is in a turn) and introduce a STEP DES to the new level Nd at this point.

Else

STEP to be created=STEP CLIMB

Generate a climb with a longitudinal speed SPEED provided by the attitude and an engine thrust provided by the gas automatic throttle.

From the performance tables, obtain a vertical rate resulting from holding speed/thrust: VS Knowing the rate of climb VS, calculate the time needed to perform the descent: T=DeltaH/VS Create a Time Marker pseudo-waypoint at the time [Time]−T.

Create a point defined by its geographic coordinates (such as latitude and longitude) at the position of the Time Marker (or on the transition point if the Time Marker is in a turn) and introduce a STEP CLIMB to the new level Nd at this point.

Endif

Endif

The clearance "reach a determined level Nd at a determined time Hd" or "ALT CSTR Nd AT Hd", can be used to insert an altitude constraint in a climbing or descent phase so as to begin to climb or descend at a given time and then to perform a levelling-off. The point defined by this time Hd is therefore a floating point. To implement this clearance illustrated in FIG. 4*a* in a climbing phase and in 4*b* in a descent phase, updating the flight plan which comprises segments consists in introducing into the flight plan of the FMS the following program:

Assumptions:

The level Nd is below the first cruising level (otherwise, it concerns the algorithm STEP ALT OF Nd AT Hd)

The level Nd is temporary. In practice, in a climb, the aircraft will ultimately reach its cruising level, and in a descent, reach the landing strip. To do this, the length Llevel or the duration Tlevel of the levelling-off will be fixed and it will be made to roll as the aircraft advances along the flight plan.

The program below is based on working by distance, with Llevel. The same program can be used working by time with Tlevel.

Initialization:

Save the flight plan in a reference flight plan FPLN REF.

In the flight plan, create a "Time Marker" type pseudo-waypoint whose HHMMSS parameter is equal to the Hd parameter. The three-dimensional position of this Time Marker is given by its frame Latitude_TM/Longitude_TM/altitude_TM.

If Time Marker belongs to the climb segment, then

If AC Alt>Nd then reject the clearance with an "UNABLE" message to ATC (there is no redescent in climbing phase)

Else

If the Time Marker is on a climb constraint level, due to a backward constraint ALT_CSTR, then:

Create a point whose geographic latitude/longitude coordinates are those of the Time Marker and transfer the ALT_CSTR constraint to this point.

Delete the forward constraints whose altitude parameters are less than the Nd parameter.

Calculate the difference between the level to be reached Nd and the starting level at the Time Marker ALT_CSTR: DeltaH=Nd−ALT_CSTR Calculate the rate of climb VS (in ft/min) or the gradient (in °) of the aircraft in the FMS climbing mode (with a longitudinal speed SPEED obtained by the attitude and an engine thrust equal to the CLIMB thrust). The algorithm below is based on working with the rate of climb VS.

Calculate the climbing time to reach the level Nd starting from the level ALT_CSTR: T=DeltaH/VS Calculate the lateral distance traveled during a time T: Dist1=GS*T where GS is the predicted ground speed over this segment, taking into account the wind.

Add the length of the level to the distance Dist1: Dist2=Dist1+Llevel.

On the flight plan (if rectilinear) or on the transition point (if transition), create a waypoint at the curvilinear distance Dist2 from the Time Marker.

Place a level constraint AT, with the Nd parameter on this point.

A climb segment is thus constructed starting from the Time Marker, followed by a levelling-off of length Llevel.

Else (the Time Marker is on a climb segment)

Create a point whose geographic latitude/longitude coordinates are those of the Time Marker.

Delete the forward constraints whose altitude parameters are less than the Nd parameter.

Calculate the difference between the level to be reached Nd and the starting level at the Time Marker ALT_TM: DeltaH=[level]−ALT_TM Knowing the profile of the climb segment (and therefore the VS), calculate the climbing time to reach the level Nd starting from the level ALT_TM: T=DeltaH/VS Calculate the lateral distance traveled during the time T: Dist1=GS*T where GS is the predicted ground speed over this segment, taking into account the wind.

Add the length of the levelling-off to the distance Dist1: Dist2=Dist1+Llevel

On the flight plan (if rectilinear) or on the transition point (if transition), create a waypoint at the curvilinear distance Dist2 from the Time Marker.

Place a level constraint AT, with the Nd parameter on this point.

Endif

Endif

Else (Time Marker belongs to the descent segment),

If AC Alt<Nd then reject the clearance with an "UNABLE" message to ATC (there is no reascent in a descent phase)

Else

If the Time Marker is on a descent constraint levelling-off, due to a backward constraint ALT_CSTR, then:

Create a point whose geographic latitude/longitude coordinates are those of the Time Marker and transfer the ALT_CSTR constraint to this point.

Delete the forward constraints whose altitude parameters are greater than the Nd parameter.

Recalculate the descent profile. Recreate a point whose geographic latitude/longitude coordinates are those of the Time Marker and transfer the ALT_CSTR constraint to this point.

On the point created, place a time constraint (RTA) with the value of the Hd parameter.

Calculate the difference between the level to be reached Nd and the starting level at the Time Marker ALT_CSTR: DeltaH=ALT_CSTR−Nd Calculate the rate of descent VS (in ft/min) or the gradient (in °) of the airplane in the FMS descent mode (VNAV mode which corresponds to a piloting of the attitude of the airplane to hold a profile in SPD mode on the automatic throttle to hold a longitudinal speed SPEED). The algorithm below is based on working with the VS.

Calculate the descent time to reach the level Nd starting from the level ALT_CSTR: T=DeltaH/||VS||

Calculate the lateral distance traveled during the time T: Dist1=GS*T where GS is the predicted ground speed over this segment, taking into account the wind.

Add the length of the levelling-off to the distance Dist1: Dist2=Dist1+Llevel.

On the flight plan (if rectilinear) or on the transition point (if transition), create a waypoint at the curvilinear distance Dist2 from the Time Marker.

Place a level constraint Nd on this point.

A descent segment is thus constructed starting from the Time Marker, followed by a levelling-off of length Llevel.

Else (the Time Marker is on a descent segment)

Create a point whose geographic latitude/longitude coordinates are those of the Time Marker.

Delete the forward constraints whose altitude parameters are greater than the Nd parameter.

Recalculate the descent profile. Recreate a point whose geographic latitude/longitude coordinates are those of the Time Marker.

On the point created, place a time constraint (RTA) with the value of the Hd parameter.

Calculate the difference between the level to be reached Nd and the starting level at the Time Marker ALT_TM: DeltaH=ALT_TM−Nd Calculate the rate of descent VS (in ft/min) or the gradient (in °) of the aircraft in the FMS descent mode (with VNAV obtained by the attitude and a longitudinal speed SPEED obtained by the gas automatic throttle). The algorithm below is based on working with the VS.

Calculate the descent time to reach the level Nd starting from the level ALT_TM: T=DeltaH/||VS||

Calculate the lateral distance traveled during the time T: Dist1=GS*T where GS is the predicted ground speed over this segment, taking into account the wind.

Add the length of the levelling-off to the distance Dist1: Dist2=Dist1+Llevel

On the flight plan (if rectilinear) or on the transition point (if transition), create a waypoint at the curvilinear distance Dist2 from the Time Marker.

Place a level constraint AT, with the Nd parameter on this point.

Endif

Endif

Else (Time Marker belongs to the cruising segment)

reject the clearance with an "UNABLE" message to ATC (processed in the STEP ALT functions)

Endif

The clearance "reach a determined level Nd at a determined time Hd" or "ALT CSTR Nd BY Hd" can be used to insert an altitude constraint in a climbing or descent phase to be reached at a given time. The point defined by this time Hd is therefore a floating point. To implement this clearance illustrated in FIG. 5*a* in the climbing phase, FIG. 5*b* in the descent phase, updating a flight plan which comprises segments consists in introducing into the FMS flight plan the following program.

If Time Marker belongs to the climbing segment, then

If AC Alt>Nd then reject the clearance with an "UNABLE" message to ATC (because there is no redescent in a climbing phase)

Else

If the Time Marker is on a climb constraint levelling-off, due to a backward constraint ALT_CSTR, then:

Create a point whose geographic latitude/longitude coordinates are those of the Time Marker.

The predicted altitude at the Time Marker is ALT_CSTR.

If ALT_CSTR<Nd then

Delete the forward constraints whose altitude parameters are less than the Nd parameter.

The latitude/longitude coordinates point is then on a climbing segment: refer to the “Time Marker on climbing segment” case Else If Alt_CSTR>Nd then On the lat/long coordinates point, place an altitude constraint equal to the Nd parameter.

Construct a lat/long coordinates point at a distance D or a time T forward of the Time Marker, and place a constraint equal to the value Nd on this point. Cyclically push back this point, so as to hold the altitude until the function is cancelled.

Else (ALT_CSTR=Nd)

Accept the request

Construct a lat/long coordinates point at a distance D or a time T forward of the Time Marker, and place a constraint equal to the Nd value on this point. Cyclically push back this point, so as to hold the altitude until the function is cancelled.

Endif

Else (the Time Marker is on a climbing segment)

Create a point whose geographic latitude/longitude coordinates are those of the Time Marker.

The predicted altitude at the Time Marker is ALT_TM.

If ALT_TM<Nd then

Delete the forward constraints whose altitude parameters are less than the Nd parameter.

On the new profile obtained, the Time Marker is offset and has new lat/long and ALT_TM coordinates:

If ALT_TM<Nd then reject the clearance with an “UNABLE” message to ATC because it is not possible to reach the altitude before the time T.

Else

On the lat/long coordinates point, place an altitude constraint equal to the Nd parameter.

Construct a lat/long coordinates point at a distance D or a time T forward of the Time Marker, and place a constraint equal to the Nd value on this point. Cyclically push back this point, so as to hold the altitude until the function is cancelled.

Endif

Else If Alt_TM>Nd then

On the lat/long coordinates point, place an altitude constraint equal to the Nd parameter.

Construct a lat/long coordinates point at a distance D or a time T forward of the Time Marker, and place a constraint equal to the Nd value on this point. Cyclically push back this point, so as to hold the altitude until the function is cancelled.

Else (ALT_TM=Nd)

Accept the request

Construct a lat/long coordinates point at a distance D or a time T forward of the Time Marker, and place a constraint equal to the Nd value on this point. Cyclically push back this point, so as to hold the altitude until the function is cancelled.

Endif

Endif

Else (Time Marker belongs to the descent segment, then)

If AC Alt<Nd then reject the clearance with an “UNABLE” message to ATC (because there is no reascent in a descent phase)

Else

If the Time Marker is on a descent constraint levelling-off, due to a backward constraint ALT_CSTR, then:

Create a lat/long coordinates point at the coordinates at the Time Marker and transfer the ALT_CSTR constraint to this point.

If ALT_CSTR>Nd then

Delete the forward constraints whose altitude parameters are greater than the Nd parameter.

The lat/long coordinates point is then located on a descent segment: refer to the “Time Marker on descent segment” case Else If Alt_CSTR<Nd then On the lat/long coordinates point, place an altitude constraint equal to the Nd parameter.

Construct a lat/long coordinates point at a distance D or a time T forward of the Time Marker, and place a constraint equal to the Nd value on this point. Cyclically push back this point so as to hold the altitude until the function is cancelled.

Else (ALT_CSTR=Nd)

Accept the request

Construct a lat/long coordinates point at a distance D or a time T forward of the Time Marker, and place a constraint equal to the Nd value on this point. Cyclically push back this point so as to hold the altitude until the function is cancelled.

Endif

Else (the Time Marker is on a descent segment)

If ALT_TM>Nd then

Delete the forward constraints whose altitude parameters are greater than the Nd parameter.

On the new profile obtained, the Time Marker is offset and has new lat/long coordinates and ALT_TM:

If ALT_TM>Nd then reject the clearance with an “UNABLE” message to ATC because the altitude cannot be reached before the time T.

Else

On the lat/long coordinates point, place an altitude constraint equal to the Nd parameter.

Construct a lat/long coordinates point at a distance D or a time T forward of the Time Marker, and place a constraint equal to the Nd value on this point. Cyclically push back this point so as to hold the altitude until the function is cancelled.

Endif

Else If Alt_TM<Nd then

On the lat/long coordinates point, place an altitude constraint equal to the Nd parameter.

Construct a lat/long coordinates point at a distance D or a time T forward of the Time Marker, and place a constraint equal to the Nd value on this point. Cyclically push back this point so as to hold the altitude until the function is cancelled.

Else (ALT_TM=Nd)

Accept the request

Construct a lat/long coordinates point at a distance D or a time T forward of the Time Marker, and place a constraint equal to the Nd value on this point. Cyclically push back this point so as to hold the altitude until the function is cancelled.

Endif

Else (Time Marker belongs to the cruising segment)

reject the clearance with an “UNABLE” message to ATC (processed in the STEP ALT functions)

Endif

The “offset lateral path by a determined distance Dd with a determined angle Ad starting at a determined time Hd1 and ending at a determined time Hd2” or “OFFSET (Dd, Ad) AT Hd1 TO Hd2”, begins at a time Hd1 which is a floating point and also ends at a floating point determined by Hd2. The OFFSET clearance makes it possible to follow a route parallel to the active flight plan, starting from a point, to arrive at another point. The required offset distance Dd and the starting and ending offset angle Ad are specified. It is not applicable to all types of “legs” in the flight plan. The function currently exists only for waypoints (OFFSET A to B). To implement this clearance illustrated in FIG. 6, updating the flight plan which comprises segments consists in introducing into the FMS flight plan the following program.

Initial Checks:

If Hd1>Hd2 (modulo 24 h) or

If (Hd2−Hd1*GS)<2*DIST+Tolerance (i.e., there is no time to perform the offset because it is already necessary to return, or even the offset is too short given the tolerances of the aircraft) then reject the clearance with an “UNABLE” message to ATC Endif Processing when the Initial Checks are Correct:

Cyclically perform the following tests:

On the flight plan, position two Time Markers at the times Hd1 and Hd2

If Hd1 or Hd2 does not belong to legs that can be offset then reject the clearance with an “UNABLE” message to ATC.

Else If there is a leg that cannot be offset between the legs starting from Hd1 to Hd2 then reject the clearance with an “UNABLE” message to ATC Else Position two geographic coordinates points Lat1/Long1 and Lat2/Long2 at the two coordinates of the Time Markers.

Use the OFFSET A to B function with A=Lat1/Long1 and B=Lat2/Long2.

Endif

The clearance “at a determined time Hd go to Pd” or “AT Hd DIRECT TO Pd” starts at a floating point determined by Hd. To implement this clearance, updating the flight plan which comprises segments consists in introducing into the FMS flight plan the following program.

Inputs:

Flight plan made up of legs (waypoints and floating legs). In the example given in FIG. 1, the flight plan is [aircraft, WP1, WP2, WP3, WP4, WP5, WP6, WP7, WP8, ARR]

N cruising levels CRZ FL1, CRZ FL2, . . . , CRZ FLN (i.e. including level changes in the cruising phase)

Vertical profile and associated predictions, altitude-wise and, where appropriate, speed-, time- and fuel-wise.

The Hd parameter of the clearance, the Pd parameter of the clearance.

The program comprises an initialization step and pre-processing, processing of the nominal case and processing of degraded cases steps.

Initialization:

The current flight plan is stored in a backup memory.

The following calculations are performed cyclically starting from the flight plan saved in the backup memory.

Pre-Processes: Processing of the Limit Values

If Hd<current time modulo 24 h, reject the clearance with an “UNABLE” message to ATC.

If Hd>arrival time, reject the clearance with an “UNABLE” message to ATC.

Processing of the Nominal Case:

If Hd<predicted time at (T/D)

Look for the first segment [WPi,WPi+1] for which the predicted times T(WPi), T(WPi+1) are such that: T(WPi)<Hd<T(WPi+1)

If Pd is before WPi+1 then reject the clearance with an “UNABLE” message to ATC because there can be no backtracking.

Else

On the path, create a Time Marker pseudo-waypoint with Hd as its parameter, then, knowing the geographic coordinates (latitude/longitude) of this pseudo-waypoint, create a point with these coordinates on the path (with management of the transitions as for the above functions)

Create a leg “DF” (Direct to Fix) starting from this point with the Pd parameter as the fix value Endif Else (Hd>predicted time at (T/D) (i.e. the time is on the descent))

Look for the first segment [WPi,WPi+1] for which the predicted altitudes Alt(WPi), Alt(WPi+1) are such that: Alt(WPi+1)<Nd<Alt(WPi)

If Pd is before WPi then reject the clearance with an “UNABLE” message to ATC

In practice, there will be no backtracking, i.e. before the point WPi+1, and the DIRECT TO on WPi starting from an altitude reached just before is useless since the aircraft is already aligned on the segment, to WPi at the moment when the Nd parameter will be reached.

Else

Save the flight plan in FPLN REF

Assume N to be a maximum number of iterations

Take i=1

On the path of the flight plan FPLN REF, create a pseudo-waypoint, at the position where the Hd parameter is reached.

This pseudo-waypoint is attached to an attachment point, which is either the waypoint that precedes it if there is one, or the current airplane position (saved) if there is no waypoint between the airplane and the pseudo-waypoint: its coordinates are therefore calculated based on the attachment point and the curvilinear distance (along the path) between the attachment point and the pseudo-waypoint.

Create a Time Marker of latitude/longitude coordinates as above, placed in the position of the Time Marker corresponding to the Hd parameter.

This pseudo-waypoint is named with the numeric value of the parameter.

Create a leg “DF” (Direct to Fix) starting from this point with the Pd parameter for the fix value.

Recalculate the vertical profile with the new lateral path.

Reposition the latitude/longitude coordinates point using its coordinates.

The predicted time at this point is T[Lat/Long]

As long as T[Lat/Long]< >Hd and i<N, perform the following loop:

Calculate the time difference between the Lat/Long point and the time Hd:

$$\text{Delta}T=T[\text{Lat/Long}]-Hd$$

$$\text{Take: } T=Hd+\text{Delta}T$$

(this means that if the predicted time at the Lat/Long point is before the Hd parameter, a calculation will be redone starting from a later time, i.e., the path will be shortened).

On the path of the flight plan FPLN REF, create a Time Marker pseudo-waypoint, at the position where the parameter T is reached.

Create a leg “DF” (Direct to Fix) starting from the corresponding Lat/Long point created with the Pd parameter for the fix value Recalculate the vertical profile with the new lateral path.

Reposition the Lat/Long point using its coordinates.

i=i+1

End While

Endif

Endif

Endif

Processing of Degraded Cases

At the end of the preceding step, recalculate the predictions of the new flight plan.

Therefore, on completion of this step, check the validity of the data by performing the calculation of the limit value processing step, on the new flight plan.

If the tests are not correct then reject the clearance with an "UNABLE" message to ATC and return to the initial flight plan (recall the backup memory)

Endif

If the DIRECT TO has significantly shortened the path, it may be that the new predictions will remove the time parameter from the limit values.

The aircraft cannot reach the time parameter before starting its Direct To WP1; in practice, if the demand were accepted, it would be impossible to fly the path from end to end, landing at the stated time at the airport. The point corresponding to this time no longer exists for the recalculated paths and the vertical climb profile and the vertical descent profile intercept below the point corresponding to this time. This case is called a Wilkinson case.

The invention claimed is:

1. A method of assisting in navigation of an aircraft, comprising:

receiving, by a ground/onboard communication system, a new clearance originating from an air traffic control authority; and updating, by a flight management system linked to the communication system upon receipt of the new clearance, without intervention of a pilot of the aircraft, a flight plan which includes a lateral path and a vertical profile associated with clearances, the flight plan being updated according to the new clearance, wherein the new clearance comprises an action conditional on the flight plan associated with a floating point of the lateral path and/or of the vertical profile, defined by a time constraint of the aircraft.

2. The method according to claim 1, wherein the new clearance requests the aircraft to climb or descend to a determined level from a determined time.

3. The method according to claim 1, wherein the new clearance requests the aircraft to reach a determined level at a determined time.

4. The method according to claim 1, wherein the new clearance requests the aircraft to climb or descend to a determined level from a determined time and hold that level.

5. The method according to claim 1, wherein the new clearance requests the aircraft to reach a determined level at a determined time and hold that level.

6. The method according to claim 1, wherein the new clearance requests the aircraft to offset the lateral path by a determined distance from a first determined time to a second determined time.

7. The method according to claim 1, wherein the new clearance requests the aircraft to, at a determined time, go directly to a determined position.

8. A method of modifying a flight plan of an aircraft by a flight management system onboard the aircraft, the method comprising:

receiving a clearance instruction from an air traffic control authority, the clearance instruction comprising an action to be performed upon occurrence of a condition;

generating at least one pseudo-waypoint in the flight plan at which the condition of the clearance instruction is estimated to occur;

determining if modifying the flight plan according to the clearance instruction and the pseudo-waypoint is achievable;

sending a rejection message to the air traffic control authority if it is determined that modifying the flight plan according to the clearance instruction and the pseudo-waypoint is not achievable; and modifying the flight plan if it is determined that modifying the flight plan according to the clearance instruction and the pseudo-waypoint is achievable.

9. The method of claim 8, further comprising:

modifying the at least one pseudo-waypoint; and determining if modifying the flight plan according to the clearance instruction and the modified pseudo-waypoint is achievable.

10. The method of claim 8, wherein the clearance instruction requests the aircraft to climb or descend to a determined level from a determined time, and the generation of the at least one pseudo-waypoint comprises generating the at least one pseudo-waypoint having a time parameter equals the determined time.

11. The method of claim 8, wherein the clearance instruction requests the aircraft to reach a determined level at a determined time, and the generation of the at least one pseudo-waypoint comprises generating the at least one pseudo-waypoint having a time parameter equals the determined time.

12. The method of claim 8, wherein the clearance instruction requests the aircraft to climb or descend to a determined level from a determined time and hold that level, and the generation of the at least one pseudo-waypoint comprises generating the at least one pseudo-waypoint having a time parameter equals the determined time.

13. The method of claim 8, wherein the clearance instruction requests the aircraft to climb or descend to a determined level at a determined time and hold that level, and the generation of the at least one pseudo-waypoint comprises generating the at least one pseudo-waypoint having a time parameter equals the determined time.

14. The method of claim 8, wherein the clearance instruction requests the aircraft to offset a lateral path of the flight plan by a determined distance from a first determined time to a second determined time, and the generation of the at least one pseudo-waypoint comprises generating a first pseudo-waypoint having a time parameter equals the first determined time and a second pseudo-waypoint having a time parameter equals the second determined time.

15. The method of claim 8, wherein the clearance instruction requests the aircraft to start moving toward a determined position directly at a determined time, and the generation of the at least one pseudo-waypoint comprises generating the at least one pseudo-waypoint having a time parameter equals the determined time.

* * * * *